Patented Jan. 17, 1928.

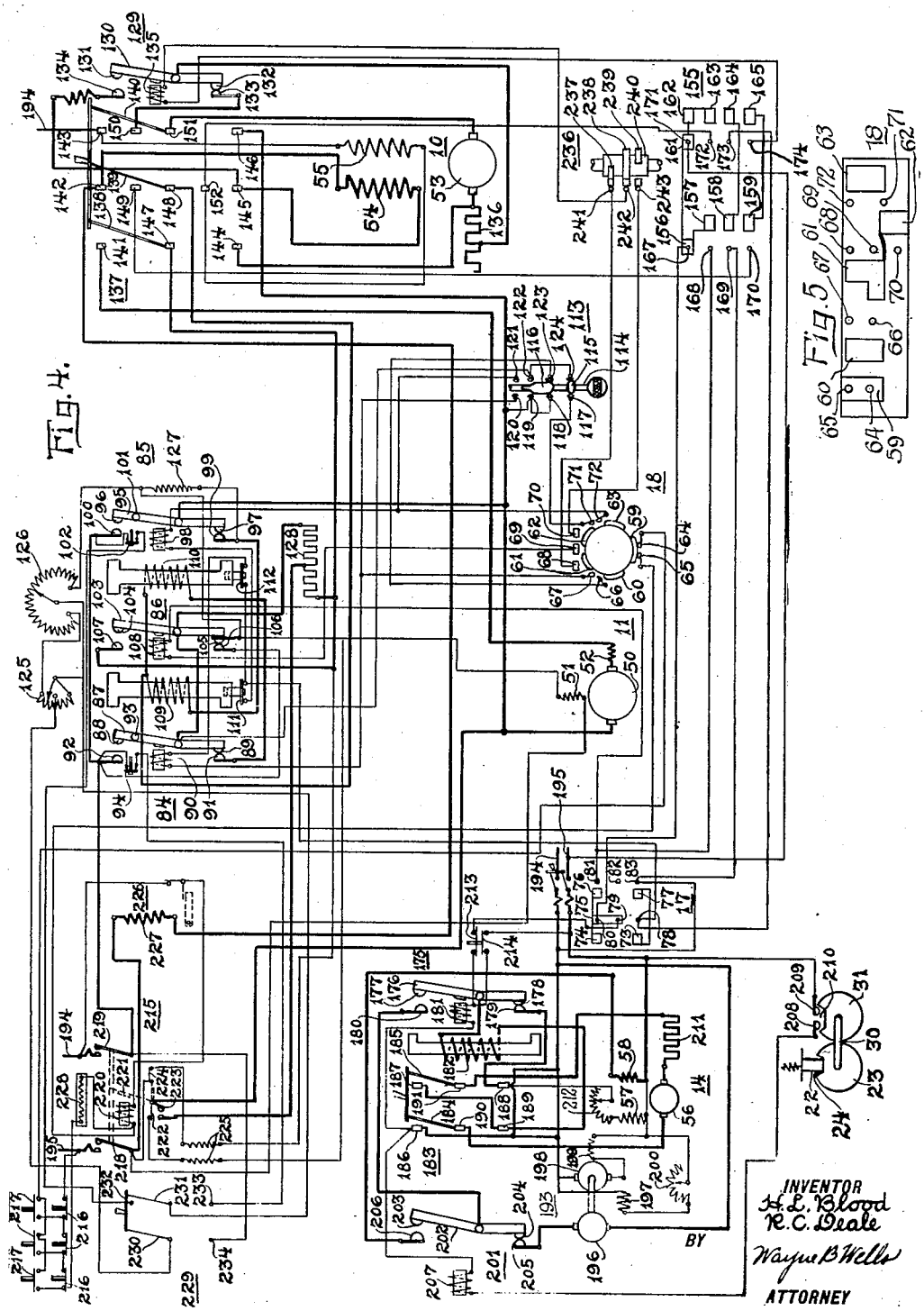

1,656,313

UNITED STATES PATENT OFFICE.

HAROLD L. BLOOD, OF NORTH PLAINFIELD, AND ROBERT C. DEALE, OF PLAINFIELD, NEW JERSEY, ASSIGNORS TO NILES-BEMENT-POND COMPANY, OF NEW YORK, N. Y., A CORPORATION OF NEW JERSEY.

CONTROL SYSTEM.

Application filed November 19, 1923. Serial No. 675,631.

Our invention relates to control systems and particularly to control systems for operating machine tools.

One object of our invention is to provide a control system that shall operate a main motor and an auxiliary motor either alternately and automatically in accordance with the operation of the main motor or at will and that shall operate the main motor and a second auxiliary motor either alternately and automatically in accordance with the operation of the main motor or at will.

Another object of our invention is to provide a control system having a main motor, an index motor, a feed motor, a pilot switch and a pendent switch that shall operate either the main motor and the index motor or the main motor and the feed motor automatically by the pilot switch and that shall control either the main motor or the feed motor at will in a forward and in a reverse direction by means of the pendent switch.

Another object of our invention is to provide a control system having a motor that shall be operated at maximum voltage during the major portion of its movement and at a reduced voltage near the end of its movement and that shall be positively stopped and locked at the end of the movement.

A further object of our invention is to provide a machine tool, having a cutting tool mounted on a reciprocating ram and a work table associated with the cutting tool, with a control system that shall operate the ram automatically by means of a pilot switch or at will by means of a manually operated switch, that shall operate the index motor to index the work table either automatically by means of the pilot switch or at will by means of a special switch, and that shall feed the cutting tool with respect to the work table by means of a feed motor either automatically under the control of the pilot switch or at will by means of the manually operated switch.

Our control system is particularly adapted to operate a machine for shaping gear wheels. Only a portion of the machine is illustrated in this application. The machine is claimed and completely described in the patent of Lyndon C. Cole No. 1,492,627 dated May 6, 1924. A portion of the control system shown in this application is illustrated and claimed in the patent of Harold L. Blood, No. 1,512,574, dated October 21, 1924.

The control system comprises a main motor which is adapted to operate a reciprocating ram carrying a cutting tool. The main motor is controlled in a forward and in a reverse direction by two main switches and an accelerating switch. The three switches are automatically controlled by a pilot switch in accordance with the movement of the ram or are controlled at will by means of a manually operated switch which is preferably a pendent switch. An index motor is provided for indexing the work with respect to the cutting tool. In the machine illustrated in the drawing, the index motor is shown in position for operating a rotatable table. An auxiliary switch is provided for governing the operation of the index motor. The index motor is also under control of the pilot switch and may be controlled at will by means of a manually operated switch. The auxiliary switch not only controls the index motor but also prevents any operation of the main motor during an indexing operation.

The index motor is mechanically and positively stopped at the end of an indexing operation in order to insure the work being indexed to a correct position. The positive stopping of the motor causes a considerable shock on the various parts of the machine even though the index motor has a dynamic braking circuit completed through it just prior to the mechanical stopping thereof. Accordingly, in a control system constructed in accordance with our invention, the index motor is operated at maximum voltage for the major portion of the indexing operation and near the end of such operation the voltage impressed on the index motor is reduced so that the motor creeps into its final position.

A feed motor is provided not only for effecting feeding movements of the cutting tool with respect to the work table but also for effecting traverse movements of the cutting tool in either direction. A transfer switch having two positions is provided for governing the operation of the various motors. In the first or generating position of the transfer switch, the main motor and the index motor may be automatically controlled by the pilot switch in accordance with movement of the ram. Moreover in the first position of the transfer switch, the main motor may be controlled by the pendent switch and traverse operation of the feed motor may be effected. In the second or slotting position of the transfer switch, the pilot switch controls not only the main motor but also the feed motor in accordance with the movement of the reciprocating ram. When the transfer switch is in the second or slotting position, no automatic operation of the index motor is effected. All indexing, when the transfer switch is in such position, must be effected by a manually operated switch. Traverse operation of the feed motor may be effected when the transfer switch is in the slotting position.

A traverse switch is provided for governing the operation of the feed motor. When the traverse switch is in the feed position, the feed motor may be controlled automatically by the pilot switch. When the traverse switch is in the second or traverse position, the feed motor may be operated in a forward or in a reverse direction at will under the control of the pendent switch.

In the accompanying drawings:

Fig. 4 is a diagrammatic view of our control system.

Fig. 5 is a developed view of the pilot switch.

Figure 1:
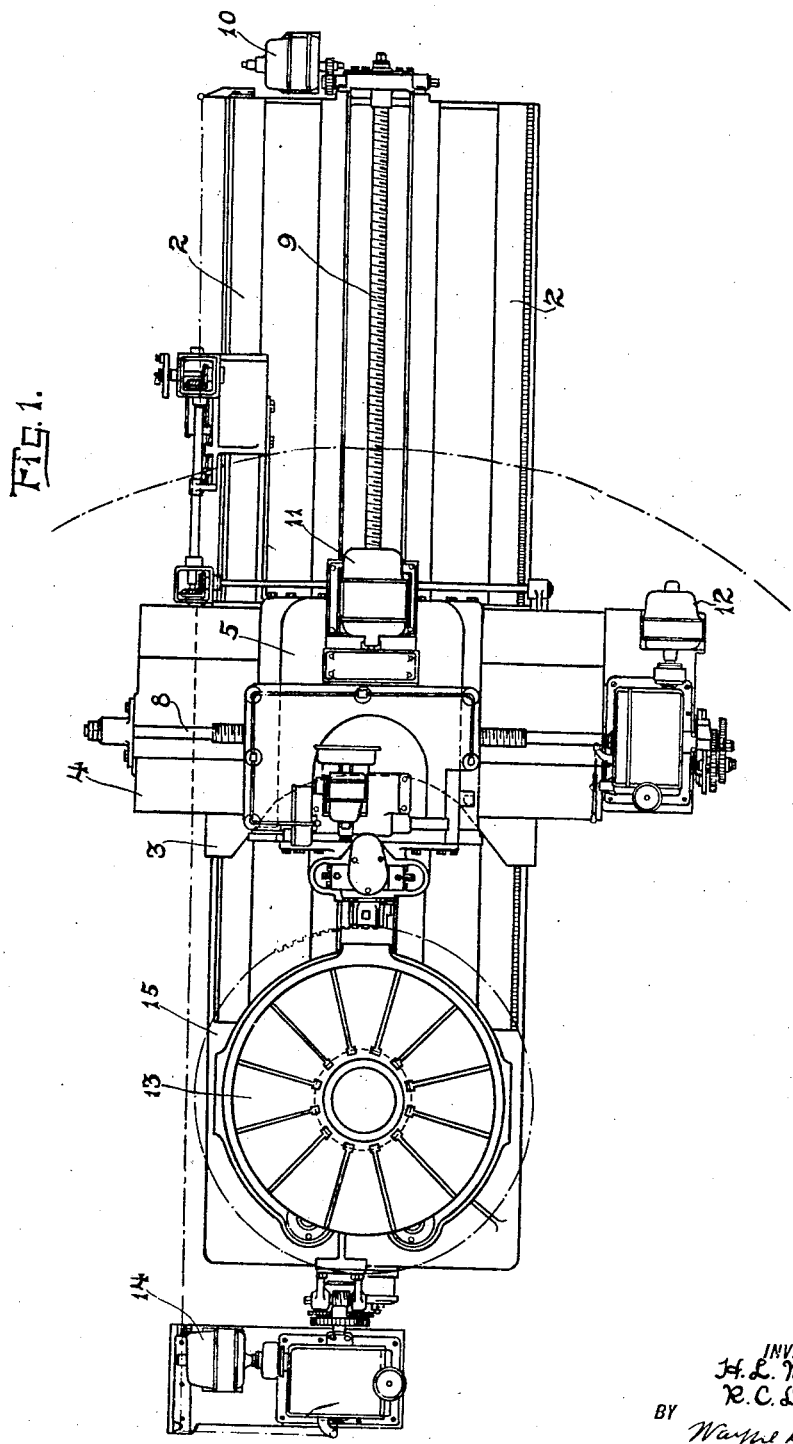
Figure 1 is a plan view of a machine adapted to be operated by our control system.
Figure 2:
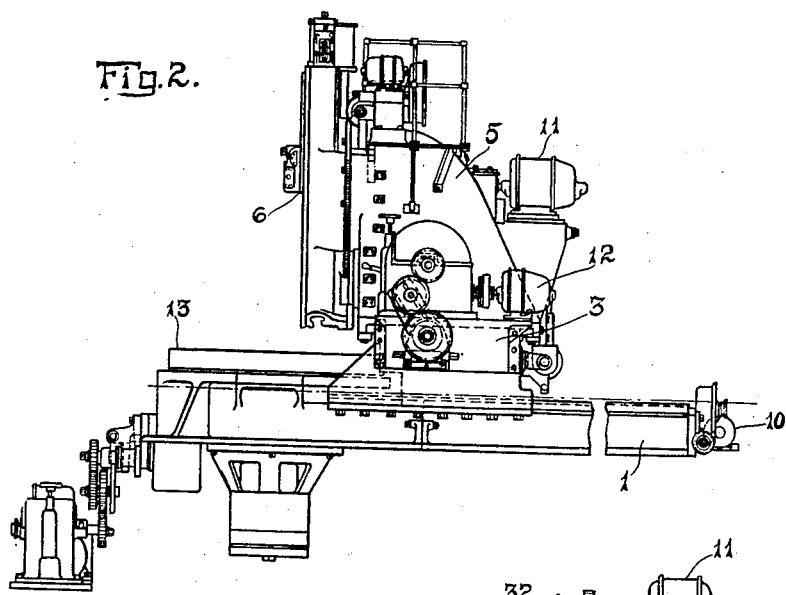
Fig. 2 is a side elevational view of the machine shown in Fig. 1.
Figure 3:
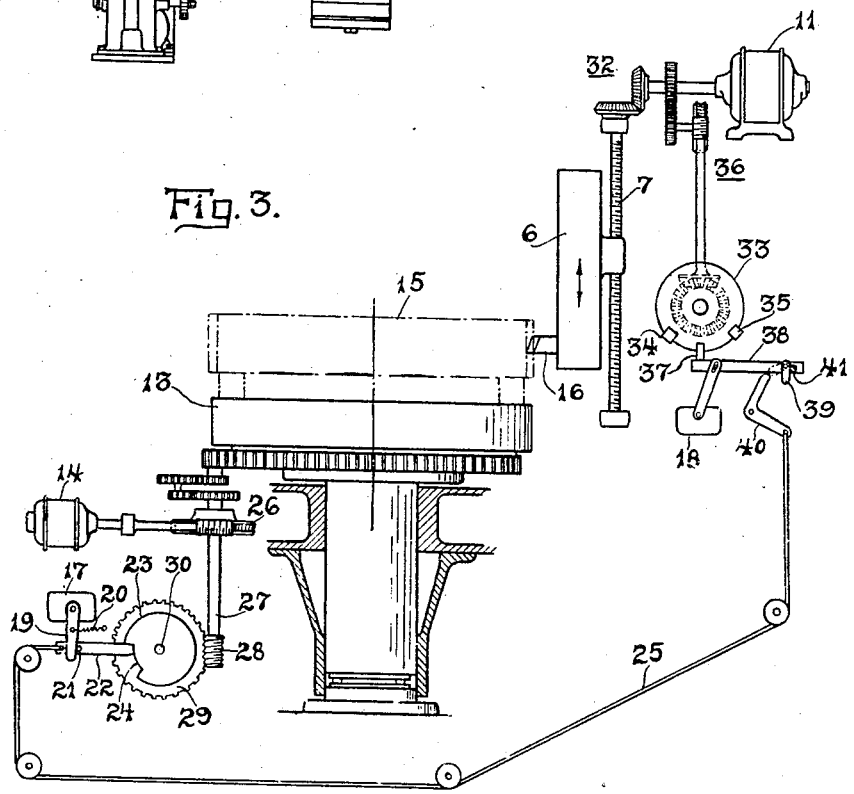
Fig. 3 is a diagrammatic view illustrating the operative relation of the main and index motors.

Referring to Figs. 1, 2 and 3 of the drawings, a machine is illustrated comprising a bed 1 upon which are formed suitable ways 2. A saddle 3 having ways 4 thereon is moved on the ways 2. A head 5, which is movable on the ways 4, carries a suitable ram 6. The ram 6 is reciprocated in the head 5 by means of a screw 7. The head 5 is movable along the ways 4 by means of a screw 8 and the saddle 3 is movable on the ways 2 by means of a screw 9. The screw 9 is operated by a feed motor 10. The screw 7 is operated by a main motor 11 and the screw 8 is operated by an auxiliary motor 12.

A work table 13, which is mounted in the bed 1 beyond the ways 2, is adapted to be rotated by means of an index motor 14. The motor 14 indexes the work 15 to correct position with respect to the cutting tool 16 which is carried by the ram 6. The cutting tool 16 preferably comprises a plurality of straight sided cutters corresponding to adjacent teeth of a rack.

The index motor 14 is controlled by an auxiliary switch 17 and the main motor 11 is controlled by a pilot switch 18. The auxiliary switch 17, as shown in Fig. 3 of the drawings, is operated by means of a lever 19. The lever 19 is held in a retracted position by means of a spring 20 and engages a pin 21 on a rod 22. The rod 22 is normally held in engagement with a disk 23 by means of the spring 20. A notch 24, which is formed in the disk 23, cooperates with the rod 22 for insuring the indexing of the work to a predetermined position. The rod is withdrawn from the notch 24 by means of a cable 25 which is operated by the main motor 11.

The operation of the feed motor and the main motor will be described further when reference is made to Fig. 4 of the drawings. However, it should be noted that when the rod 22 is withdrawn from the notch 24, the auxiliary switch 17 is operated to effect operation of the index motor 14. The index motor 14 is connected to the work table 13 by means of gearing 26 and is connected to the disk 23 by means of a rod 27, a worm 28, and a worm wheel 29. The worm wheel 29 and the disk 23 are mounted on a shaft 30 which also carries a contact disk 31 for insuring the operation of the index motor at low voltage near the end of an indexing operation. The auxiliary switch 17 not only operates the index motor 14 but also prevents any operation of the main motor 11 during the indexing operation. When the disk 23 has made one rotation, the rod 22 drops into the notch 24 and permits the spring 20 to so operate the auxiliary controller 17 as to stop the index motor 14. At the same time, a circuit is completed for operating the main motor 11.

The main motor 11 is connected to the screw 7 by means of suitable bevel gears 32, as shown in Fig. 3 of the drawings. The main motor 11 also operates a dial 33 which carries two dogs 34 and 35. The motor is connected to the dial by means of suitable gearing 36. The dogs 34 and 35 are adapted to engage a projection 37 on a rod 38 for operating not only the pilot switch 18 but also for effecting operation of the cable 25 to control the operation of the auxiliary switch 17.

At the end of the downward movement of the ram 6, the dog 34 engages the projection 37 for so operating the pilot switch 18 as to reverse the direction of rotation of the main motor 11. At such time, no operation of the index motor 14 is effected. However, at the end of the upward movement of the ram 6, the dog 35 engages the projection 37 not only for operating the pilot switch 18 to reverse the direction of rotation of the main motor but also for operating the cable 25 to control the auxiliary switch 17. The rod 38 carries a pivotally mounted dog 39 which is adapted to engage a bell crank lever 40. The pivotally mounted dog 39 engages a block 41 projecting from the rod 38 so that the dog is only adapted to operate the bell crank lever 40 when the rod 38 is moved towards the left, as shown in Fig. 3 of the drawings. When the rod 38 is moved towards the right, as shown in Fig. 3 of the drawings, the dog 39 rides over the bell crank lever 40 without effecting any movement thereof. When the rod 38 is moved by the dog 35 the operation of the main motor 11 is stopped until the indexing operation is completed.

Referring to Figs. 4 and 5 of the drawings, the main motor 11 is shown comprising an armature 50, a shunt field-magnet winding 51 and an interpole winding 52. The feed motor 10 is shown comprising an armature 53, a series field-magnet winding 54, and a shunt field-magnet winding 55. The index motor 14 is shown comprising an armature 56, a shunt field-magnet winding 57, and a series field-magnet winding 58. The pilot switch 18 is illustrated comprising contact segments 59 to 63, inclusive, which are adapted to engage contact fingers 64 to 72, inclusive.

The auxiliary switch 17 comprises contact segments 73 to 77, inclusive, which are adapted to engage contact fingers 78 to 83, inclusive. The auxiliary switch 17 is illustrated in the indexing position in Fig. 4 of the drawings. In the running position of the switch 17, the contact segments 74 and 76 are moved into engagement with the contact fingers 80 and 81 and the contact segments 73 and 77 are moved into engagement with the contact fingers 78 and 83.

Two main switches 84 and 85 and an accelerating switch 86 are provided for governing the operation of the main motor 11 and under certain conditions for governing the operation of the feed motor 10. The main switch 84 comprises a switch arm 87, which carries two contact members 88 and 89, and an operating coil 90. In the released position of the switch, the contact member 89 engages a stationary contact member 91 and in the operative position of the switch, the contact member 88 engages a stationary member 92. A pin 93, which projects from the side of the arm 87, is adapted to open a switch 94 when the switch is moved to an operative position. The switch 84 operates at the end of the upward movement of the ram 6 for reversing the direction of rotation of the main motor to effect a movement of the ram downwardly, The main switch 85 comprises a switch arm 95, which carries two contact members 96 and 97, and an operating coil 98. In the released position of the switch arm, the contact member 97 engages a stationary contact member 99 and in the operative position of the switch arm, the contact member 96 engages a stationary member 100. A pin 101, which projects from the side of the arm 95, is adapted to open a switch 102 when the switch arm 95 is moved to an operative position.

The accelerating switch 86 comprises a switch arm 103, which carries two contact members 104 and 105. The contact member 105 is insulated from the switch arm 103 and engages a stationary contact member 106 in the released position of the switch arm. The contact member 104 engages a stationary contact member 107 in the opertive position of the switch arm. A coil 108 is provided for effecting operation of the switch arm 103.

A blow-out coil 109 is associated with the main switch 84 and a blow-out coil 110 is associated with the main switch 85. The blow-out coil 109 is adapted to operate a switch 111 and the blow-out coil 110 is adapted to operate a switch 112. When the coils 109 and 110 are de-energized, the switches 111 and 112 are closed. The switches 111 and 112 serve to prevent the simultaneous operation of the two main switches 84 and 85 and also prevent the operation of either main switch 84 and 85 when a dynamic-braking current is flowing through the main motor.

A manually operated switch 113, which is illustrated as a pendent switch, is provided for governing the operation of the main switches 84 and 85 when it is desired to effect operation of the main motor 11 at will or to effect traverse operation of the feed motor 10. The pendent switch comprises a rod 114 which carries two contact segments 115 and 116. The contact segments 115 and 116 are adapted to engage contact fingers 117 to 124, inclusive. In the normal position of the switch 113, the contact segment 115 bridges the contact fingers 117 and 124 to permit operation of the main switches 84 and 85 by the pilot switch 18. When it is desired to operate the main switches 84 and 85 by the pendent switch, the rod 114 is raised for separating the contact segments 116 and 115 from the contact fingers 118, 123, 117 and 124 to insure against any operation of the main switches by the pilot switch.

Two resistors 125 and 126 are provided in the circuit of the shunt field-magnet winding 51 for controlling the speed of the main motor and a choke resistance 127 is also provided in the circuit of such field-magnet winding. An accelerating resistor 128, which is controlled by the accelerating switch 86 is provided in the circuit of the armature 50.

A feed switch 129 is provided for governing the operation of the feed motor 10. The feed switch 129 comprises a contact arm 130 which carries two contact members 131 and 132. In the released position of the contact arm, the contact member 132 engages a stationary contact member 133 and in the operative position of the switch arm, the contact member 131 engages a stationary contact member 134. A coil 135 is provided for operating the switch arm 130. A resistor 136 is provided in the armature circuit of the feed motor 10.

A traverse switch 137 is provided for effecting either intermittent feeding movements by the motor 10 or continuous movements in a forward or in a reverse direction by the motor 10. The traverse switch comprises three switch blades 138, 139 and 140 which are adapted to engage contact members 141 to 152, inclusive.

A transfer switch 155 is provided for effecting either a generating or a slotting operation by the machine which is operated by the control system. The transfer switch comprises contact segments 156 to 159, inclusive, and contact segments 161 to 165, inclusive, which are adapted to engage contact fingers 167 to 174, inclusive. In the generating position of the transfer switch 155, as shown in Fig. 4 of the drawings, the main motor 11 and the index motor 14 are automatically controlled in accordance with the movement of the ram 6. When the transfer switch is moved towards the left, as shown in Fig. 4, to the slotting position, the main motor 11 and the feed motor 10 are automatically controlled in accordance with the movement of the ram 6.

An indexing switch 175 is provided for operating the index motor 14. The switch 175 comprises a switch arm 176 which carries two contact members 177 and 178. The contact member 178 is adapted to engage a stationary contact member 179 in the released position of the switch arm and the contact member 177 is adapted to engage a stationary contact member 180 in the operative position of the switch arm. A coil 181 is provided for operating the switch arm. A suitable blow-out coil 182 is associated with the switch 175.

A switch 183 is provided for governing the direction of rotation of the index motor 14. The switch 183 comprises two switch blades 184 and 185 which are adapted to engage contact fingers 186 to 191, inclusive. In the raised position of the switch, as shown in Fig. 4 of the drawings, clockwise indexing of the work table is effected and in the lower position of the switch 183 counter clockwise indexing of the work table is effected.

A motor-generator set 193 is operated from the supply conductors 194 and 195 for supplying a reduced voltage to the indexing motor 14 near the end of an indexing operation. The motor-generator set comprises a generator, having an armature 196 and field-magnet winding 197, and a motor having an armature 198 and a field magnet winding 199. A rheostat 200 is provided for governing the current flow through the field-magnet winding 197.

A supplemental switch 201 is provided for changing the voltage supplied to the index motor near the end of an indexing operation. The switch 201 comprises a switch arm 202 which carries two contact members 203 and 204. In the released position of the switch arm, the contact member 204 engages a stationary contact member 205 and in the operative position of the switch arm, the contact member 203 engages a stationary contact member 206. A coil 207 is provided for operating the switch arm 202.

The contact disk 31, which is operated by the index motor, is adapted to bridge two contact fingers 208 and 209 which are included in the circuit of the coil 207. A slot 210 is formed in the disk 31 to disconnect the contact fingers 208 and 209 from the disk 31 just prior to the movement of the rod 22 into the slot 24 formed in the disk 23. An armature resistor 211 is provided in circuit with the armature of the index motor. A rheostat 212 is provided for governing the current flow through the shunt field-magnet winding 57 of the index motor. A suitable switch 213 is provided for opening the circuit of the coil 181 at any time desired and a similar switch 214 is provided for closing the circuit of the coil 181 at will.

A circuit breaker 215 is provided for opening the circuits of the motors in case of low voltage or overload circuit conditions. A plurality of stop buttons 216, which are distributed at convenient positions around the machine, are provided for opening the circuit breaker 215 in case of an emergency. A corresponding number of re-set buttons 217 are distributed around the machine for re-setting the circuit breaker. As will be explained hereinafter, it is impossible to re-set the circuit breaker 215 by means of the re-set buttons 217 unless the pilot switch 18 is in the off position.

The circuit breaker 215 comprises two switch blades 218 and 219 which are adapted to connect the circuits of the motors to the supply conductors 194 and 195. A coil 220 operates an armature 221 for controlling the switch blades 218 and 219. The armature 221 also controls switch members 222, 223, and 224 for completing an emergency dynamic-braking circuit through the main motor in case of abnormal circuit conditions. During emergency dynamic-braking, the braking resistors 225 are included in the circuit of the shunt field.

A relay 226, having an energizing coil 227 in the circuit of the main motor, is provided for controlling the energizing circuit of the coil 220. The stop buttons 216, as heretofore set forth, serve to open the circuit of the coil 220 and the re-set buttons 217 serve to complete a circuit through the coil 220. A holding resistor 228 is provided for connecting the coil 220 across the supply conductors independent of the re-set buttons. The current supplied through the holding resistor 228 is not sufficient to operate the circuit breaker but is sufficient to hold the circuit breaker in operative position.

A two-pole double-throw switch 229 is provided for reversing the speed ratio of the cutting tool movement in an upward and in a downward direction. The switch 229 comprises two switch blades 230 and 231. When in the upper position, the switch blade 231 engages a contact member 232 for connecting the switch 102 in circuit with the resistors 125 and 126. In such position of the switch 229, downward movement of the cutting tool is effected at a slower rate than the upward movement of such tool. When the switch 229 is in the lower position, the switch blade 231 engages a contact member 233 for inserting the switch 94 in the circuit of the resistors 125 and 126. In such position of the switch 229, the upward movement of the cutting tool is effected at a slower rate than the downward movement of such tool. It should also be noted that in the lower position of the switch 229, the switch blade 230 engages a contact member 234 for short circuiting a portion of the resistor 125. The short circuiting of a portion of the resistor 125 lowers the maximum return speed of the cutting tool during cutting on the upward stroke so that the emergency braking may take place in a safe time. If such short circuit were not provided for a portion of the resistor 125, it is possible that upon failure of voltage during the return stroke, the emergency braking would fail to operate in a satisfactory manner.

A limit switch 236, which is operated by the feed motor in any suitable manner, is adapted to limit the feeding movements. The limit switch comprises contact segments 237, 238 and 239 which are mounted on a drum 240. The contact segments are adapted to engage contact fingers 241, 242 and 243.

Assuming the pendent switch 113 to be in the position shown, the switch 229 to be closed in the upper position, the transfer switch 155 to be in the generating position as shown, the auxiliary switch 17 to be in the running position, the traverse switch 137 to be in the feed position, and the reciprocating ram 6 to be on a downward cutting movement, the operation of the system is as follows: Near the end of the downward movement of the ram 6, the dog 34 on the disk 33 effects operation of the pilot switch 18. The contact segment 63 is moved to bridge the contact fingers 71 and 72 for completing a circuit for operating the main switch 85.

The energizing circuit for the main switch 85 extends from the supply conductor 194 through the contact fingers 83 and 78, which are bridged by the contact segments 73 and 77, switch 111, coil 98 of the main switch 85, contact fingers 71 and 72, which are bridged by the contact segment 63, contact fingers 117 and 124, which are bridged by the contact segment 115, switch arm 87, contact members 91 and 89, blow-out coil 110, contact members 148 and 142, which are bridged by the switch blade 139, coil 227, and the switch blade 218 to the other supply conductor 195. The main switch 85 is operated to so operate the main motor 11 as to effect an upward movement of the ram 6.

The circuit through the main motor 11 extends from the supply conductor 194, through the switch blade 219, contact members 100 and 96, switch arm 95, armature 50, coil 52, contact members 141 and 147, which are bridged by the switch blade 138, accelerating resistor 128, contact arm 87, contact members 91 and 89, blowout coil 110, contact members 148 and 142, which are bridged by the switch blade 139, coil 227, and the switch blade 218 to the supply conductor 195.

The accelerating switch 86 is operated, upon closing of the switch 85, for short circuiting the armature resistor 128. The energizing circuit for the accelerating switch extends from the supply conductor 194 through the switch blade 219, contact members 100 and 96, switch arm 95, contact members 118 and 123, which are bridged by the contact segment 116, contact fingers 66 and 69, which are bridged by the contact segments 61 and 62, coil 108, contact fingers 80 and 81, which are bridged by the contact segments 74 and 76, and the contact fingers 167 and 171, which are bridged by the contact segment 156 and 161, to the supply conductor 195. The switch arm 103 is moved for effecting engagement between the contact members 104 and 107 to short circuit the resistor 128.

Prior to the operation of the accelerating switch 86, the shunt field magnet winding 51 of the main motor 11 is connected directly across the supply conductors by a circuit which extends from the supply conductor 194 through the switch blade 219, contact members 105 and 106, shunt field-magnet winding 51, and the switch blade 218 to the supply conductor 195. Upon operation of the accelerating switch 86, the circuit for the shunt field-magnet winding extends from the supply conductor 194 through the switch blade 219, resistors 125 and 126, shunt field-magnet winding 51, and the switch blade 218 to the supply conductor 195. Thus the speed of the upward stroke of the ram is increased by inserting the resistors 125 and 126 in the circuit of the shunt field-magnet winding 51.

Near the end of the upward movement of the ram 6, the dog 35 operates the rod 38 not only to change the position of the pilot switch 18 but also to effect operation of the auxiliary switch 17. The movement of the pilot switch 18 releases the main switch 85 to complete a dynamic-braking circuit through the main motor 11. The dynamic-braking circuit through the main motor extends from one terminal of the armature 50 through the switch arm 95, contact members 97 and 99, blow-out coils 109 and 110, contact members 91 and 89, switch arm 87, resistor 128, contact members 141 and 147, which are bridged by the switch blade 138, and the coil 52 to the other terminal of the armature 50. The contact segment 60 is moved to bridge the contact fingers 66 and 67 but no circuit is completed for operating the main switch 84 until after an indexing operation has been effected.

The auxiliary switch 17 is moved to the position shown in Fig. 4 of the drawings to effect operation of the index switch 175. The circuit for operating the index switch extends from the supply conductor 194 through the contact member 186, coil 181, switch 213, contact fingers 79 and 80, which are bridged by the contact segment 75, and the contact fingers 167 and 171, which are bridged by the contact segments 156 and 161, to the supply conductor 195.

The index switch 175 is operated and a circuit is completed through the index motor which extends from the supply conductor 194 through the contact members 186 and 190, which are bridged by the switch blade 184, armature 56, resistor 211, contact members 191 and 187, which are bridged by the switch blade 185, blow-out coil 182, switch arm 176, contact members 180 and 177, switch arm 202 of the switch 201, which is assumed to be in an operative position, contact members 203 and 206, and the series field-magnet winding 58 to the supply conductor 195. If the contact fingers 208 and 209 are not bridged by the contact disk 31 when the indexing switch 175 is operated, then the circuit for the index motor extends from one terminal of the armature 196 of the motor-generator set 193 through the contact members 204 and 205, switch arm 202, contact members 180 and 177, switch arm 176, blow-out coil 182, contact members 187 and 191, which are bridged by the switch blade 185, resistor 211, armature 56, and contact members 186 and 190, which are bridged by the switch blade 184, to the other terminal of the armature 196.

The indexing operation is commenced, as heretofore set forth, by moving the cable 25 for withdrawing the rod 22 from the slot 24 and at the same time operating the auxiliary switch 17. The operation of the index motor is continued until the rod 22 enters the slot 24 for so moving the auxiliary switch 17 as to open the energizing circuit for the index switch 175. The slot 210 in the contact disk 31 is so positioned as to release the switch 201 just prior to the entering of the rod 22 into the slot 24. When the contact fingers 208 and 209 are bridged by the contact disk 31, the switch 201 is operated for maintaining the maximum voltage on the index motor. However, it is desirable to let the index motor creep to its final position. Accordingly, the slot 210 is so positioned as to release the switch 201 just prior to the movement of the rod 22 into the slot 24. In case it is desired to stop the index motor 14 at any time, the switch 213 is operated to open the energizing circuit for the index switch 175. In case it is desired to operate the index motor at will, the index switch is operated by the switch 214. The circuit, which is completed by the switch 214, extends from the supply conductor 194, through the coil 181 and the switch 214 to the supply conductor 195.

Upon movement of the auxiliary switch 17 to the running position, a circuit is completed for operating the main switch 84. The energizing circuit for the main switch 84 extends from the supply conductor 194 through the contact fingers 83 and 78, which are bridged by the contact segments 73 and 77 of the auxiliary switch 17, switch 112, coil 90 of the main switch 84, contact fingers 66 and 67, which are bridged by the contact segment 60, contact fingers 118 and 123, which are bridged by the contact segment 116, switch arm 95, contact members 97 and 99, blow-out coil 109, contact members 148 and 142, which are bridged by the switch blade 139, coil 227, and the switch blade 218 to the supply conductor 195.

The main switch 84 is operated for completing a circuit through the main motor 11 for effecting downward movement of the ram 6. The circuit through the main motor extends from the supply conductor 194 through the switch blade 219, contact members 92 and 88, switch arm 87, resistor 128, contact members 147 and 141, which are bridged by the switch blade 138, coil 52, armature 50, switch arm 95, contact members 97 and 99, blow-out coil 109, contact members 148 and 142, which are bridged by the switch blade 139, coil 227, and the switch blade 218 to the supply conductor 195. The motor 11 is operated to effect a downward movement of the ram 6.

The accelerating switch 87 is operated for short circuiting the resistor 128. The energizing circuit for the accelerating switch 86 extends from the supply conductor 194, through the switch arm 219, contact members 92 and 88, switch arm 87, contact members 117 and 124, which are bridged by the contact segment 115, contact fingers 71 and 69, which are bridged by the contact segments 61 and 62, coil 108, contact fingers 81 and 80, which are bridged by the contact segments 74 and 76, and the contact fingers 167 and 171, which are bridged by the contact segments 156 and 161, to the supply conductor 195.

Upon operation of the accelerating switch, the circuit for the shunt field magnet winding 51 extends from the supply conductor 194 through the switch blade 219, switch 102, contact member 232, switch blade 231, resistor 126, shunt winding 51, and the switch blade 218 to the supply conductor 195. Thus, during the downward movement of the ram 6, the resistor 125 is not included in the circuit of the shunt field-magnet winding so that such movement is effected at reduced speed. At the end of the downward movement, the pilot switch 18 is again operated to repeat the cycle of operations above described.

The re-set circuit for the circuit breaker extends from the supply conductor 194, through the relay 226, coil 220, contact fingers 64 and 65, which are bridged by the contact segment 59, one of the re-set switches 217, and one of the stop switches 216, to the supply conductor 195. Thus, it is apparent the circuit breaker cannot be re-set unless the pilot switch 18 is in the off position. The holding circuit for the coil 220 of the circuit breaker extends from the supply conductor 194 through the relay 226, coil 220, resistor 228, and the stop switches 216 to the supply conductor 195.

In case it is desired to operate the main motor 11 at will by the pendent switch, the rod 114 is moved upwardly. The contact segment 115 disengages the contact fingers 117 and 124 and the contact segment 116 disengages the contact fingers 118 and 123 to prevent any control of the main switches by the pilot switch 18. If it is desired to effect a downward movement of the ram 6, the rod 114 is turned towards the left to bridge the contact fingers 119 and 120 by the contact segment 116. The bridging of such contact fingers effects operation of the main switch 84 to rotate the main motor 11 so as to move the ram downwardly. The energizing circuit for the main switch 84 extends from the supply conductor 194 through the contact fingers 83 and 78, which are bridged by the contact segments 73 and 77, switch 112, coil 90, contact fingers 119 and 120, which are bridged by the contact segment 116, switch arm 95, contact members 97 and 99, coil 109, contact members 142 and 148, which are bridged by the switch blade 139, coil 227, and the switch blade 218 to the supply conductor 195. The circuit completed through the main motor 11 is the same as the circuit heretofore traced when describing the operation of the switch 84 by the pilot switch. It may be noted, however, that the accelerating switch 86 is not operated inasmuch as it is desirable to operate the motor 11 at reduced speed when under the control of the pendent switch 113.

In case it is desired to operate the main switch 85 and effect an upward movement of the ram, the rod 114 is rotated towards the right, as shown in Fig. 4 of the drawings, to bridge the contact fingers 121 and 122 by the contact segment 116. The circuit for operating the main switch 85 extends from the supply conductor 194 through the contact fingers 83 and 78, which are bridged by the contact segments 77 and 73, switch 111, coil 98, contact fingers 121 and 122, which are bridged by the contact segment 116, switch arm 87, contact members 89 and 91, blow-out coil 110, contact members 148 and 142, which are bridged by the switch blade 139, coil 227, and the switch blade 218 to the supply conductor 195. The main switch 85 completes a circuit through the main motor 11 in the manner heretofore described.

In the slotting position of the transfer switch 155, automatic operation of the index motor 14 is stopped and automatic operation of the feed motor 10 is effected at each end of the stroke of the ram 6. Assuming the traverse switch to be in the feed position and the transfer switch to be in the slotting position, the operation of the main motor 11 and the feed motor 10 is as follows: Near the end of the downward movement of the ram, the pilot switch 18 is operated, in the manner heretofore set forth, for moving the contact segment 63 to bridge the contact fingers 71 and 72. A circuit is completed for operating the main switch 85. The energizing circuit for the main switch 85 extends from the supply conductor 194, through the contact member 83, contact members 169 and 173, which are bridged by the contact segments 158 and 164, contact member 78, switch 111, coil 98, contact fingers 71 and 72, which are bridged by the contact segment 63, contact fingers 117 and 124, which are bridged by the contact segment 115, contact arm 87, contact fingers 91 and 89, coil 110, contact members 148 and 142, which are bridged by the switch blade 139, coil 227, and the switch blade 218 to the supply conductor 195.

The main switch 85 completes a circuit through the main motor in the manner heretofore set forth and the accelerating switch 86 is operated by a circuit which extends from the supply conductor 194 through the switch blade 219, contact members 100 and 96, switch arm 95, contact members 118 and 123, which are bridged by the contact segment 116, contact fingers 66 and 69, which are bridged by the contact segments 61 and 62, coil 108 of the accelerating switch 86, and the contact fingers 168 and 171, which are bridged by the contact segments 157 and 162 to the supply conductor 195. The accelerating switch is operated to short circuit the resistor 128 in the manner heretofore set forth.

Near the end of the upward movement of the ram 6, the pilot switch 18 is operated to release the main switch 85 and to effect operation of the main switch 84. A dynamic braking circuit is completed through the main motor 11 upon release of the switch 85 in the manner heretofore set forth. The circuit for operating the main switch 84 extends from the supply conductor 194 through the contact member 83, contact fingers 169 and 173, which are bridged by the contact segments 158 and 164, contact finger 78, switch 112, coil 90, contact fingers 67 and 66, which are bridged by the contact segment 60, contact fingers 118 and 123, which are bridged by the contact segment 116, switch arm 95, contact members 97 and 99, coil 109, contact members 148 and 142, which are bridged by the switch blade 139, coil 227, and the switch blade 218 to the supply conductor 195. The main switch 84 is operated for completing the circuit through the main motor in the manner above set forth.

Upon operation of the main switch 84, a circuit is completed for operating the accelerating switch 86. The circuit for operating the accelerating switch extends from the supply conductor 194, through the switch blade 219, contact members 92 and 88, switch arm 87, contact members 124 and 117, which are bridged by the contact segment 115, contact fingers 71 and 69, which are bridged by the contact segments 61 and 62, coil 108, and the contact fingers 168 and 171, which are bridged by the contact segments 157 and 162, to the supply conductor 195. The accelerating switch is operated for short circuiting the resistor 128.

Preferably, the cable 25 is released in order to effect no operation of the auxiliary switch 17. However, the operation of the auxiliary switch at such time would in no way effect operation of the index motor 14 inasmuch as the energizing circuit for the index switch 175 is broken by the transfer switch 155. Moreover, it will be noted that the auxiliary switch 17 in no way controls the operation of the main switches and that the main switches 84 and 85 and the accelerating switch 87 are operated by the pilot switch 18 irrespective of the position of the auxiliary switch 17.

At the end of the upward movement of the ram, a circuit is completed for operating the feed switch 129. The circuit for operating switch 129 extends from the supply conductor 194 through the switch blade 219, contact members 92 and 88, switch arm 87, contact members 117 and 124, which are bridged by the contact segment 115, contact fingers 71 and 70, which are bridged by the contact segments 61 and 62, contact fingers 242 and 243 of the limit switch, which are bridged by the contact segments 239 and 238, coil 135 of the feed switch, contact fingers 170 and 174, which are bridged by the contact segments 159 and 165, contact fingers 149 and 142, which are bridged by the switch blade 139, coil 227, and the switch blade 218 to the supply conductor 195.

Upon operation of the feed switch 129, a circuit is completed for operating the feed motor 10. The circuit through the feed motor extends from the supply conductor 194 through the contact fingers 143 and 151, which are bridged by the switch blade 140, armature 53, resistor 136, switch arm 130, contact fingers 131 and 134, series winding 54, contact finger 142, coil 227, and the switch blade 218 to the supply conductor 195. The shunt field-magnet winding 55 of the feed motor is energized by a circuit which extends from the supply conductor 194, through the winding 55, contact fingers 171 and 172, which are bridged by the contact segments 162 and 163, to the supply conductor 195.

The feed motor 10 is operated until the contact segment 239 disengages the contact finger 243. At such time, the feed switch 129 is released to complete a dynamic-braking circuit through the motor 10. The dynamic-braking circuit extends from one terminal of the armature 53 through the contact fingers 151 and 150, which are bridged by the switch blade 140, contact fingers 132 and 133, switch arm 130, and the resistor 136 to the other terminal of the armature 53. The contact segments 237 and 239 of the limit switch extend approximately half way around the drum 240 whereas the contact segment 238 extends entirely around the drum. Thus, when the contact segment 239 is separated from the contact finger 243, the contact segment 237 engages the contact finger 241. Accordingly, when the pilot switch 18 is moved in a reverse direction, at the end of the downward movement of the ram 6, the contact segments 61 and 62 are moved to complete a circuit for the coil of the feed switch through the contact segment 237 of the limit switch.

The energizing circuit for the coil of the feed switch 129 at the end of the down movement of the ram extends from the supply conductor 194 through the contact members 100, and 96, switch arm 95, contact fingers 118 and 123, which are bridged by the contact segment 116, contact fingers 66 and 68, which are bridged by the contact segments 61 and 62, contact fingers 241 and 242, which are bridged by the contact segments 237 and 238, coil 135, contact fingers 170 and 174, which are bridged by the contact segments 159 and 165, contact fingers 149 and 142, which are bridged by the switch blade 139, coil 227, and the switch blade 218 to the supply conductor 195. The feed switch 129 is operated in the manner heretofore set forth for completing the circuit through the feed motor 10. The feeding movement is limited by the separation of the contact segment 237 from the contact finger 241.

In case it is desired to effect traverse operation of the feed motor 10, the traverse switch 137 is placed in its lower position and the rod 114 of the pendent switch 113 is moved to its upper position. By moving the pendent switch to its upper position, the pilot switch 18 is disconnected from the main switches. By rotating the rod 114 of the pendent switch 113 towards the left, as shown in Fig. 4 of the drawings, the main switch 84 is operated for rotating the motor 10 continuously in one direction and upon rotating the rod 114 of the pendent switch in a reverse direction, the main switch 85 is operated to effect continuous movement of the feed motor 10 in a reverse direction.

When the rod 114 of the pendent switch is rotated toward the left, a circuit is completed for operating the main switch 84 which extends from the supply conductor 194, through the contact finger 83, contact fingers 169 and 173, which are bridged by the contact segments 158 and 164, contact finger 78, switch 112, coil 90, contact fingers 120 and 119, which are bridged by the contact segment 116, switch arm 95, contact members 99 and 97, coil 109, contact members 148 and 145, which are bridged by the switch blade 139, series field 54, contact member 142, coil 227 and the switch blade 218 to the supply conductor 195.

The main switch 84 is operated and a circuit is completed for the feed motor 10, which extends from the supply conductor 194 through the switch blade 219, contact members 92 and 88, switch arm 87, resistor 128, contact members 147 and 144, which are bridged by the switch blade 138, armature 53, contact fingers 151 and 146, which are bridged by the switch blade 140, contact arm 95, contact members 99 and 97, blow-out coil 109, contact members 148 and 145, which are bridged by the switch blade 139, series winding 54, contact member 142, coil 227, and the switch blade 218 to the supply conductor 195.

Upon rotation of the rod 115 towards the right as shown in Fig. 4 of the drawings, a circuit is completed through the coil of the main switch 85. The circuit extends from the supply conductor 194 through the contact member 83, contact fingers 169 and 173, which are bridged by the contact segments 158 and 164, contact member 78, switch 111, coil 98, contact fingers 121 and 122, which are bridged by the contact segment 116, switch arm 87, contact members 91 and 89, coil 110, contact members 148 and 145, which are bridged by the switch blade 139, series field 54, contact member 142, coil 227, and the switch blade 218 to the supply conductor 195.

The main switch 85 is operated and a circuit is completed for the feed motor 10. The motor circuit extends from the supply conductor 194, through the switch blade 219, contact members 100 and 96, switch arm 95, contact members 146 and 151, which are bridged by the switch blade 140, armature 53, contact members 144 and 147, which are bridged by the switch blade 138, resistor 128, switch arm 87, contact members 91 and 89, blow-out coil 110, contact members 148 and 145, which are bridged by the switch blade 139, series field 54, contact member 142, coil 227, and the switch blade 218 to the supply conductor 195. The motor 10 is operated to effect a traverse operation of the motor 10 in a reverse direction.

If the transfer switch 155 is in the generating position and it is desired to effect a traverse operation it is essential to have the auxiliary switch 17 in the running position. The circuits completed by the pendent switch 113 for operating the main switches 84 and 85 are the same as heretofore traced. The circuit through the shunt field magnet winding 55 for the feed motor 10 extends from the supply conductor 194 through the contact member 143, winding 55, contact members 152 and 145, which are bridged by the switch blade 139, winding 54, switch member 142, coil 227, and the switch blade 218 to the supply conductor 195.

Modifications in the system and in the arrangement and location of parts may be made within the spirit and scope of our invention and such modifications are intended to be covered by the appended claims.

What we claim is:

1. In a control system for a machine tool, the combination with a main motor, an index motor and a feed motor, of means for automatically controlling the main motor and the index motor, means for automatically controlling the main motor and the feed motor, and means to prevent simultaneous operation of the index motor and the feed motor.

2. In a control system for a machine tool, the combination with a main motor, an index motor, and a feed motor, of means for automatically effecting alternate operation of the main motor and the index motor, means for automatically effecting alternate operation of the main motor and the feed motor, and switching means to selectively operate either of said automatic means.

3. In a control system for a machine tool, the combination with a main motor, an index motor, and a feed motor, of means for automatically effecting alternate operation of the main motor and the index motor in accordance with the operation of the main motor, means for automatically effecting alternate operation of the main motor and the feed motor in accordance with the operation of the main motor, and switching means to selectively operate either of said automatic means.

4. In a control system for a machine tool, the combination with a main motor, an index motor, and a feed motor, of means for automatically effecting alternate operation of the main motor and the index motor in accordance with the operation of the main motor, means for automatically effecting alternate operation of the main motor and the feed motor in accordance with the operation of the main motor, switching means to selectively operate either of said automatic means, and means for effecting traverse movement of the feed motor at will.

5. In a control system for a machine tool, the combination with a main motor, an index motor, a feed motor, and a pilot switch automatically operated by said main motor, of means for controlling the main motor and the index motor by the pilot switch, means for controlling the main motor and the feed motor by the pilot switch, and means to selectively operate either of said automatic means controlled by the pilot switch.

6. In a control system for a machine tool, the combination with a main motor, an index motor, a feed motor, a transfer switch, and a pilot switch automatically operated by said main motor, of means for controlling the main motor and the index motor by the pilot switch with the transfer switch in one position, means for controlling the main motor and the feed motor by the pilot switch with the transfer switch in a second position, and means for controlling the operation of the main motor, the index motor and the feed motor at will.

7. In a control system for a machine tool, the combination with a main motor, an index motor, and a feed motor, of means comprising a transfer switch for automatically effecting alternate operation of the main motor and the index motor when in one position and for automatically effecting alternate operation of the main motor and the feed motor when in a second position.

8. In a control system for a machine tool, the combination with a main motor, an index motor, and a feed motor, of means comprising a transfer switch for automatically effecting alternate operation of the main motor and the index motor in accordance with the operation of the main motor when in one position and for automatically effecting alternate operation of the main motor and the index motor in accordance with the operation of the main motor when in a second position.

9. In a control system for a machine tool, the combination with a main motor, an index motor, and a feed motor, of means comprising a transfer switch for automatically effecting alternate operation of the main motor and the index motor in accordance with the operation of the main motor when in one position and for automatically effecting alternate operation of the main motor and the feed motor in accordance with the operation of the main motor when in a second position, and means for effecting traverse movements of the feed motor in either direction at will.

10. In a control system for a machine tool, the combination with a main motor, an index motor, and a feed motor, of means comprising a transfer switch, when in one position, for automatically effecting alternate operation of the main motor and the index motor in accordance with the operation of the main motor and, when in a second position, for automatically effecting operation of the main motor and the feed motor in accordance with the operation of the main motor, and means for effecting operation of the main motor, the index motor and the feed motor at will.

11. In a control system for a machine tool, the combination with a main motor, an index motor and a feed motor, of a pilot switch automatically operated by the main motor, a manually operated switch, means for automatically controlling the main motor and the index motor by said pilot switch, means for automatically controlling the main motor and the feed motor by said pilot switch, and means for controlling the main motor at will by said manual switch and for controlling the feed motor at will by said manual switch.

12. In a control system for a machine tool, the combination with a main motor, an index motor, and a feed motor, of a pilot switch automatically operated by the main motor, a manually operated switch interlocked with said pilot switch, means for automatically controlling the main motor and the index motor by said pilot switch, means for automatically controlling the main motor and the feed motor by said pilot switch, and means for controlling the main motor at will by said manual switch and for controlling the feed motor at will by said manual switch.

13. In a control system for a machine tool, the combination with a rotatable member, a reciprocating member, a motor for indexing the rotatable member, a main motor for operating the reciprocating member, and a feed motor for effecting feeding movements between the rotatable member and the reciprocating member, of means for automatically operating the main motor and the index motor in accordance with the movement of the reciprocating member, and means for automatically operating the main motor and the feed motor in accordance with the movement of the reciprocating member.

14. In a control system for a machine tool, the combination with a rotatable member, a reciprocating member, an index motor for operating the rotatable member, a main motor for operating the reciprocating member, and a feed motor for effecting feeding movements between the rotatable member and the reciprocating member, of means comprising a transfer switch for automatically operating the index motor and the main motor in accordance with the movement of the reciprocating member in one position thereof and for automatically operating the feed motor and the main motor in accordance with the movement of the reciprocating member in a second position.

15. In a control system for a machine tool, the combination with a rotatable member, a reciprocating member, an index motor for operating the rotatable member, a main motor for operating the reciprocating member, and a feed motor for effecting feeding movements by the reciprocating member, of means for automatically operating the main motor and the index motor in accordance with the movement of the reciprocating member, and means for automatically operating the main motor and the feed motor in accordance with the movement of the reciprocating member.

16. In a control system for a machine tool, the combination with a rotatable member, a reciprocating member, an index motor for operating the rotatable member, a main motor for operating the reciprocating member, and a feed motor for effecting feeding movements between the rotatable member and the reciprocating member, of means comprising a transfer switch for automatically operating the index motor and the main motor in accordance with the movement of the reciprocating member in one position thereof and for automatically operating the feed motor and the main motor in accordance with the movement of the reciprocating member in a second position thereof, and means comprising a traverse switch for effecting traverse movements of the feed motor at will.

17. In a control system for a machine tool, the combination with a rotatable member, a reciprocating member, an index motor for operating the rotatable member, a main motor for operating the reciprocating member, and a feed motor for effecting feeding movements between the rotatable member and the reciprocating member, of means comprising a transfer switch for automatically operating the index motor and the main motor in accordance with the movement of the reciprocating member in one position thereof and for automatically operating the feed motor and the main motor in accordance with the movement of the reciprocating member in a second position thereof, and means comprising a traverse switch for automatically operating the feed motor to effect intermittent feeding movements in one position and for operating the feed motor to effect traverse movements in opposite directions at will in a second position.

18. In a control system for a machine tool, the combination with a main motor, an index motor, and a feed motor, of means for automatically effecting alternate operation of the main motor and the index motor, a traverse switch, means in one position of the traverse switch for automatically effecting alternate operation of the main motor and the feed motor and in a second position of the traverse switch for effecting traverse movements of the feed motor in opposite directions at will.

19. In a control system for a machine tool, the combination with a main motor, an index motor, a feed motor, a transfer switch, and a traverse switch, of means, when the transfer switch is in one position, for automatically effecting alternate operation of the main motor and the index motor, means, when the transfer switch is in a second position and the traverse switch is in a set position, for automatically effecting alternate operation of the main motor and the feed motor, and means in a second position of the traverse switch for effecting traverse operation of the feed motor in a forward or in a reverse direction.

20. In a control system for a machine tool, the combination with a main motor, an index motor, a feed motor, a pilot switch operated by the main motor, a traverse switch, and a transfer switch, of means when the transfer switch is in one position for operating the main motor and the index motor automatically by the pilot switch and for operating the main motor and the feed motor at will, means when the transfer switch is in a second position and the traverse switch is in a set position for operating the main motor and the feed motor automatically by the pilot switch and for operating the main motor and the index motor at will, and means in a second position of the traverse switch for operating the feed motor at will.

21. In a control system, the combination with a motor, means for effecting intermittent rotation of said motor, and mechanical means for positively stopping the motor drifting at the end of each intermittent movement, of means for maintaining a maximum voltage on the armature of said motor during the major portion of each intermittent movement and for reducing the voltage impressed on the armature of said motor near the end of each intermittent movement.

In testimony whereof, we hereto affix our signatures.

ROBERT C. DEALE.
HAROLD L. BLOOD.